United States Patent
Svensson

(10) Patent No.: US 9,926,092 B2
(45) Date of Patent: Mar. 27, 2018

(54) MONITORING SYSTEM, PACKAGING MACHINE, METHOD AND COMPUTER PROGRAM

(71) Applicant: Tetra Laval Holdings & Finance S.A., Pully (CH)

(72) Inventor: Ulf Svensson, Höllviken (CH)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 541 days.

(21) Appl. No.: 14/399,344

(22) PCT Filed: May 14, 2013

(86) PCT No.: PCT/EP2013/059955
§ 371 (c)(1),
(2) Date: Nov. 6, 2014

(87) PCT Pub. No.: WO2013/171222
PCT Pub. Date: Nov. 21, 2013

(65) Prior Publication Data
US 2015/0096267 A1    Apr. 9, 2015

(30) Foreign Application Priority Data
May 16, 2012   (SE) ...................................... 1250502

(51) Int. Cl.
*G06F 7/00*        (2006.01)
*B65B 57/02*       (2006.01)
(Continued)

(52) U.S. Cl.
CPC ................ *B65B 57/02* (2013.01); *B65B 3/02* (2013.01); *B65B 7/16* (2013.01); *B65B 57/00* (2013.01);
(Continued)

(58) Field of Classification Search
None
See application file for complete search history.

(56) References Cited

U.S. PATENT DOCUMENTS 4,472,922 A * 9/1984 Romagnoli ............. B65B 57/10
                                                    53/508
6,397,557 B1 * 6/2002 Bassissi .................. B29C 53/54
                                                    53/51
(Continued)

FOREIGN PATENT DOCUMENTS

JP        2002308232 A        10/2002
JP        2011508327 A         3/2011
(Continued)

OTHER PUBLICATIONS

International Search Report (PCT/ISA/210) dated Aug. 12, 2013, by the European Patent Office as the International Searching Authority for International Application No. PCT/EP2013/059955.

*Primary Examiner* — Yolanda R Cumbess
(74) *Attorney, Agent, or Firm* — Buchannan Ingersoll & Rooney PC

(57) ABSTRACT

A monitoring system for a packaging machine comprises a plurality of functional units arranged to perform operations in sequence including to form or receive a package, fill the package with liquid or solid content and seal the package. The monitoring system comprises a plurality of signal inputs, each arranged to receive signals from respective functional units indicating status or measured values; a graphical user interface permitting interaction with an operator of the packaging machine; and a processor arranged to process received signals and control operation of the graphical user interface, wherein the processor is arranged to, from the signals, identify an event if any of the functional units is preventing any other functional unit in the sequence to operate, and upon any such identified event, enable the (Continued)

graphical user interface to provide an indication thereupon in a displayed representation of the functional units of the packaging machine.

15 Claims, 4 Drawing Sheets

(51) Int. Cl.
  *B65B 57/00* (2006.01)
  *G05B 19/418* (2006.01)
  *B65B 3/02* (2006.01)
  *B65B 7/16* (2006.01)
  *G06F 3/0484* (2013.01)

(52) U.S. Cl.
  CPC ....... *G05B 19/418* (2013.01); *G06F 3/04847* (2013.01); *G05B 2219/31467* (2013.01); *Y02P 90/02* (2015.11)

(56) References Cited

U.S. PATENT DOCUMENTS

| | | | |
|---|---|---|---|
| 8,543,233 | B2 | 9/2013 | Donati et al. |
| 2002/0168438 | A1* | 11/2002 | Foreman ............ B29C 35/0288 425/135 |
| 2004/0254666 | A1 | 12/2004 | Bonnain et al. |
| 2005/0012608 | A1 | 1/2005 | Havekost et al. |
| 2006/0231295 | A1* | 10/2006 | Yamaguchi ............... B65B 1/32 177/25.18 |
| 2007/0061786 | A1 | 3/2007 | Zhou et al. |
| 2010/0287879 | A1* | 11/2010 | Donati ............. G05B 19/41845 53/52 |

FOREIGN PATENT DOCUMENTS

| | | |
|---|---|---|
| RU | 2 495 470 C2 | 10/2013 |
| WO | WO 01/00491 A1 | 1/2001 |
| WO | WO 03/025862 A2 | 3/2003 |
| WO | WO 2005/109122 A1 | 11/2005 |

\* cited by examiner

MONITORING SYSTEM, PACKAGING MACHINE, METHOD AND COMPUTER PROGRAM

TECHNICAL FIELD

The present invention generally relates to a monitoring system for a packaging machine, such a packaging machine, a method for monitoring a packaging machine and a computer program for implementing the method.

BACKGROUND

Machines performing aggregated operations also imply that different process steps need to interact properly. As such machines become more complex, it may be hard for an operator to have a clear overview of the complex machinery. One issue that may occur due to this is that the operator may not be able to distinguish between errors, such as a part or unit of the machine is malfunctioning because something is broken, stuck or jammed, and normal events that may temporary delay, stall or reduce capacity of the machine, which may be caused by normal physical limitations such as the time needed for heating or cooling a batch of material to be used.

The complex machines can be monitored by using a multitude of sensors or collecting information from a multitude of local controllers in the different units of the machine. The information from these sensors and/or controllers may constitute a large amount of data. Traditionally, these data have been presented or been able to be accessed by the operator, and normally only as a code and/or values for the respective signal, and sometimes where the code is translated to a short description for respective signal. Further, alarm notification approaches have been used for actual errors, wherein the alarm mechanism may have been used such that alarms also are generated where there actually is no real error. This may give an operator a misleading picture of the state of the machine.

An operator may have problems interpreting the situation from this large amount of data, and when the machine for example stalls or slows down, the operator may misinterpret the data for being an error, stop the machine and call for service, although the machine only was temporarily waiting or slowing down due to natural causes.

It is therefore a desire to provide an approach for facilitating for the operator to interpret the status of the machine with the aim to improve machine operation and thus efficiency of the machine.

SUMMARY

An object of the invention is to at least alleviate the above stated problem. The present invention is based on the understanding that facilitating an operator's understanding of status of a packaging machine, such as when one or more functional units is preventing one or more other functional unit, or the whole sequence of functional units, to operate fully or partially, correct decisions by the operator are more likely and the operation of the machine will thus be improved. Thereby, occurring events that are not errors, and thus should not be fixed, can be identified as such non-error events, and the operator can be prevented from deciding to take actions that would interfere with the normal operation of the packaging machine. The inventor has found that by identifying such non-error events by processing of the signals, and presenting the event to the operator, misinterpretations by the operator can be avoided.

According to a first aspect, there is provided a monitoring system for a packaging machine, where the packaging machine comprises a plurality of functional units arranged to perform operations in sequence including to form or receive a package, fill the package with liquid or solid content and seal the package. The monitoring system comprises a plurality of signal inputs, each arranged to receive signals from respective of said functional units indicating status or measured values; a graphical user interface arranged to enable interaction with an operator of the packaging machine; and a processor arranged to process said received signals and control operation of said graphical user interface, wherein the processor is arranged to, from said signals, identify an event if any of said functional units is preventing any other functional unit in the sequence to operate, and upon any such identified event, enable the graphical user interface to provide an indication thereupon in a displayed representation of the functional units of the packaging machine.

The indication may further comprise an indication of a parameter value being associated to that functional unit preventing any other functional unit in the sequence to operate and an indication of an ongoing action for causing that parameter value to enter a value where the functional unit associated with the event becomes able to fully operate. The processor may cause the graphical user interface to provide the indication of the parameter and the ongoing action upon receiving, through the graphical user interface, a user interaction associated with the indication of the event for the associated functional unit in the displayed representation of the functional units of the packaging machine.

The processor may for the processing of the received signals be arranged to form a data structure with data items linked to respective functional unit of the packaging apparatus, to populate the data items, for each functional unit providing valid parameters, with said valid parameters, and to determine whether the event of any functional units preventing any other functional unit in the sequence to operate has occurred, for any set of data items in the data structure, respectively, based on said parameters.

According to a second aspect, there is provided a packaging machine comprising a plurality of functional units (102) arranged to perform operations in sequence including to form a package, fill the package with liquid or solid content and seal the package; and a monitoring system according to the first aspect.

The plurality of functional units may comprise a filling unit arranged to fill a package with the liquid or solid content; and a sealing unit arranged to seal the filled package.

The plurality of functional units may further comprise a packaging material receiving unit arranged to receive packaging material; and a package forming unit arranged to form a piece of packaging material into at least a part of the package, wherein the packaging machine is arranged to provide formed packages to the filling unit. The plurality of functional units may further comprise a packaging material cutting unit arranged to cut packaging material provided from the packaging material supply and provide the piece of packaging material to the packaging material receiving unit.

The plurality of functional units may alternatively further comprise a package receiving unit arranged to receive empty packages, wherein the packaging machine is arranged to provide the received packages to the filling unit.

The plurality of functional units may further comprise a sterilising unit arranged to sterilise the package before filling.

The plurality of functional units may further comprise a forming unit arranged to form plastic into a part of a package or into a package.

The plurality of functional units may further comprise an ejection unit arranged to eject filled and sealed packages out of the packaging machine.

According to a third aspect, there is provided a method of monitoring a packaging machine, where the packaging machine comprises a plurality of functional units arranged to perform operations in sequence including to form or receive a package, fill the package with liquid or solid content and seal the package. The monitoring method comprises receiving a plurality of signal inputs from respective of said functional units indicating status or measured values; processing said received signals; and controlling operation of a graphical user interface. The processing of said signals comprises identifying an event if any of said functional units is preventing any other functional unit in the sequence to operate, and the controlling of operation of the graphical user interface comprises, upon any such identified event, enabling the graphical user interface to provide an indication thereupon in a displayed representation of the functional units of the packaging machine.

The providing of the indication may further comprise providing an indication of a parameter value being associated to that functional unit preventing any other functional unit in the sequence to operate and providing an indication of an ongoing action for causing that parameter value to enter a value where the functional unit associated with the event becomes able to fully operate through the graphical user interface. The providing of the indication of the parameter and the ongoing action may be performed upon receiving, through the graphical user interface, a user interaction associated with the indication of the event for the associated functional unit in the displayed representation of the functional units of the packaging machine.

The processing of the received signals may further comprise forming a data structure with data items linked to respective functional unit of the packaging apparatus, populating the data items, for each functional unit providing valid parameters, with said valid parameters, and determining whether the event of any functional units preventing any other functional unit in the sequence to operate has occurred, for any set of data items in the data structure, respectively, based on said parameters.

According to a fourth aspect, there is provided a computer program comprising computer executable program code including instructions which when executed by a processor of a monitoring system for a packaging machine causes the processor to perform the method according to the third aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
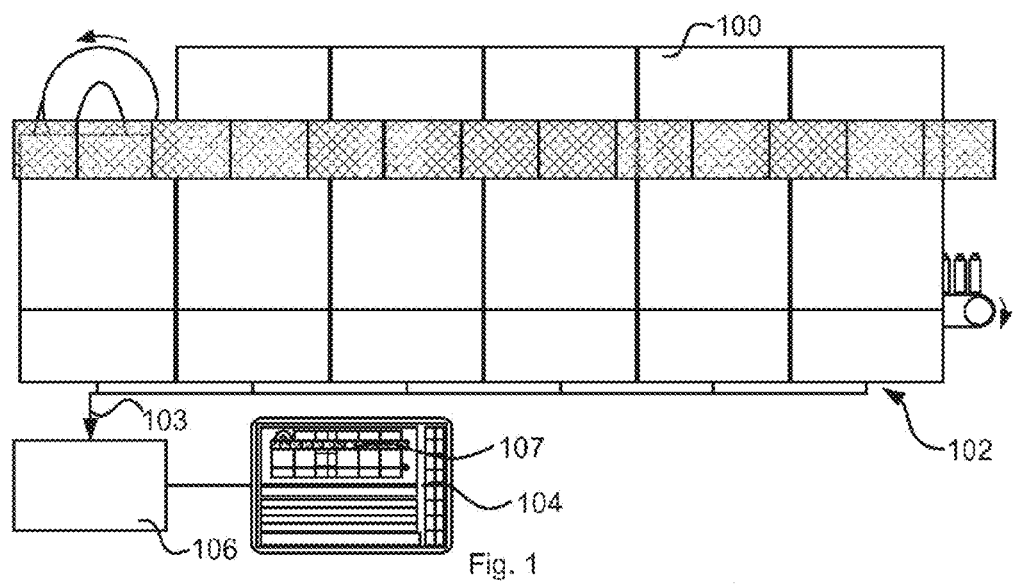
FIG. 1 illustrates a packaging machine according to an embodiment.
Figure 2:
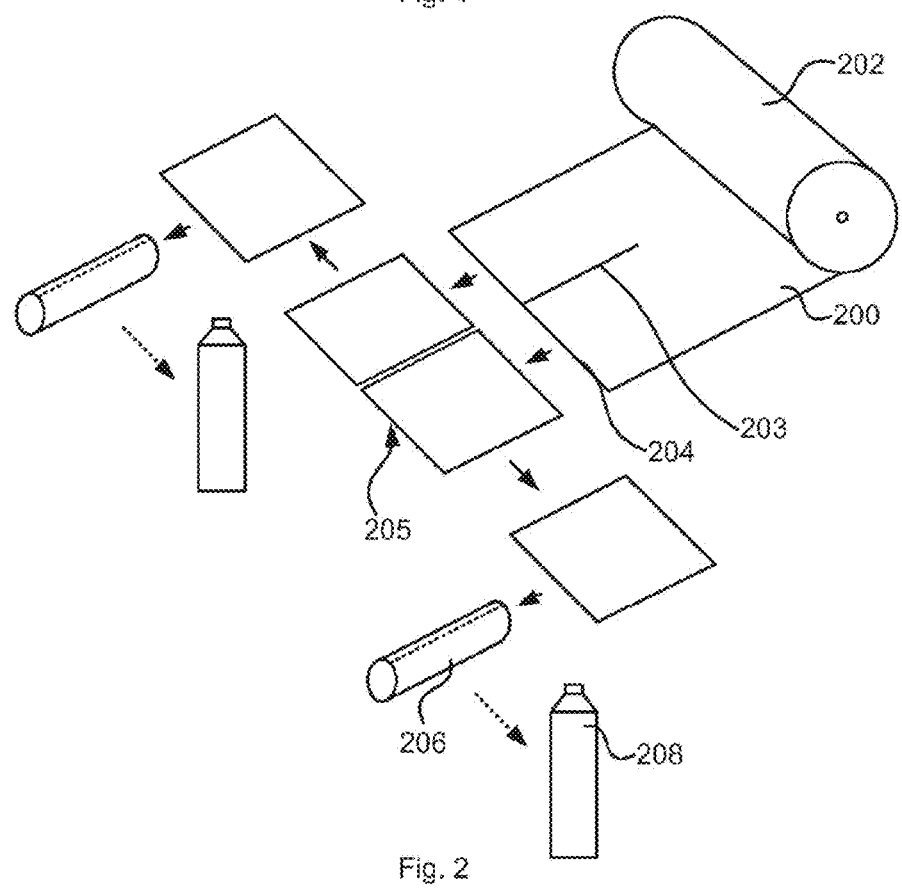
FIG. 2 schematically illustrates an example of producing a package from a packaging material, where a few functional steps are illustrated.

FIG. 1 illustrates a packaging machine 100 according to an embodiment. The packaging machine comprises a plurality of functional units 102 which are arranged to perform operations in sequence. The packaging machine 100 can thus become fairly complex and can comprise a unit for cutting packaging material which comes from a packaging material supply, e.g. a roll of packaging material as illustrated at the upper left of FIG. 1. The cutting can include cutting out a piece of packaging material, such as packaging carton suitable for holding liquid content, for one package which then is provided to a package forming unit where the piece of packaging material is formed into at least a part of the package. FIG. 2 schematically illustrates an example of this process where the packaging material 200 is rolled out from the packaging material supply 202, cut along line 203, 204 such that two pieces 205 of packaging material, i.e. sheets, are achieved, where the two pieces 205 of packaging material are provided to parallel lines of package forming where the sheets are formed e.g. to a cup-shaped form 206 which then can be filled with liquid content and sealed, e.g. by moulding a top with a reclosable cap, i.e. to achieve a bottle-like package 208 filled with the liquid content.

Returning to FIG. 1, the packaging machine can thus also comprise a package forming unit. Further unit for performing functions of the packaging can be a sterilising unit to prepare the package for filling, a filling unit providing the liquid content into the package, and a sealing unit for sealing the package. Other units, such as for marking, batch packing of packages, etc., can also be included. From this, it can be understood that the interaction between these units, which depend on each other due to the sequential nature of the packaging process, becomes fairly complex. For example, the forming, which may include some type of welding or gluing which may need to be kept hot enough for proper operation, the provision of the liquid content, which may need to be kept cool enough for keeping the content fresh, the sterilising may need to have certain temperatures and/or controlled atmosphere, the sealing may need several temperatures, pressures etc. within certain limits, etc., where one or more or all of these circumstances may not always be achieved instantly. Therefore, sensors and/or controllers of the respective functional units 102 provides signals 103 which are provided to a monitoring system comprising a graphical user interface, GUI, 104 and a processor 106 arranged to process the signals 103 and control the operation of the GUI 104. Here, the processor 106 can comprise one or more physical processors working in parallel or in a processing network. The task of this monitoring system is thus to provide, through the GUI 104, information to an operator such that correct decisions about the operation of the packaging machine 100 can be made.

The information to the operator is provided through the GUI 104 by presenting a representation 107 of the packaging machine 100, wherein the operator easily can understand the provided information. Through interaction with the GUI 104, e.g. by interacting with a touch screen, or using a pointer or selector approach presented on a screen and controlled by for example a mouse, touchpad or trackball. Here, the GUI 104 can comprise one or more physical GUIs, e.g. screens located locally and/or remotely from the machine. Where the machine is large, e.g. the line of functional units is physically extended and/or the machine is expected to be operated from any of its sides, more than one local GUI can be provided such that an operator does not have to move far to reach a GUI.

Figure 3:
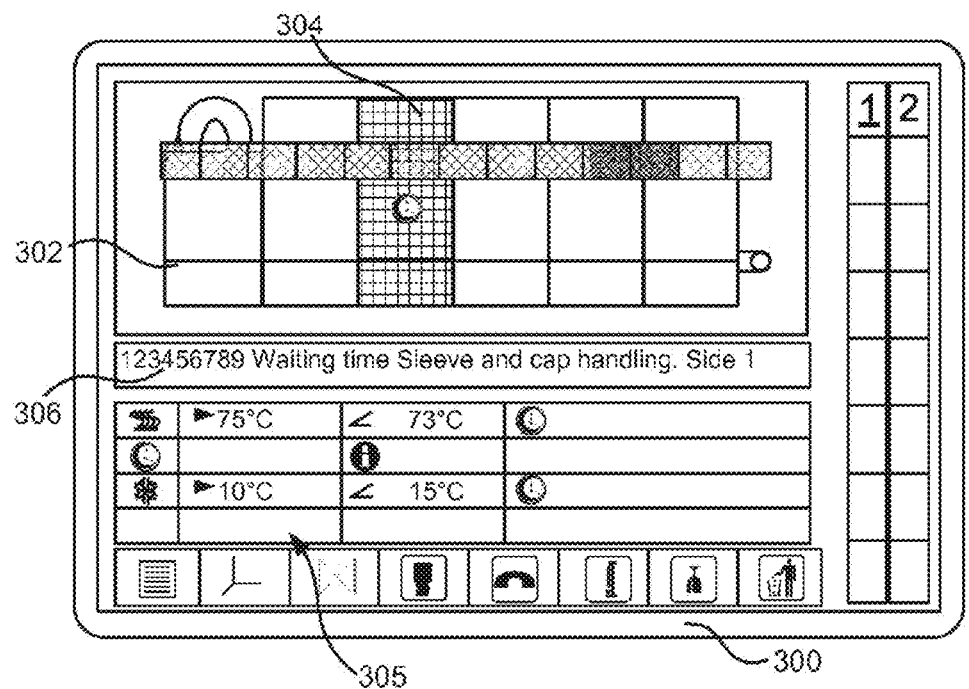
FIG. 3 illustrates an example of a graphical user interface according to an embodiment.

FIG. 3 illustrates an example of a graphical user interface, GUI, 300 according to an embodiment. The GUI 300 presents a representation 302 of the packaging machine. In the example view, an event has occurred which is illustrated by a unit in the representation 302 is indicated 304, e.g. by a pattern, a change in colour, being encircled or shadowed. The indication 304 can also include a symbol, as here given by example of a clock indicating a delay or stall. Relevant parameters 305 for the event can be illustrated in a field of the GUI 300. These can for example be viewed as an event is identified. However, as more than one event can be present simultaneously, the parameters 305 can be viewed upon user interaction with the indication 304 in the representation 302. In the given example, a parameter is indicated to be related to heating (the symbol to the left of first line) and have a target value of 75° C., and it is also indicated that the actual value is 73° C. and a symbol is indicating that a controller is waiting for the temperature to reach the target value. Next line in the example indicates the waiting symbol, here a clock, and can indicate an information symbol which the operator can interact with to get for example further information about the procedure. Such further information can also be provided upon operator interaction with the other symbols and/or values presented on the GUI 300. For example, the further information can be presented in an information field 306 of the GUI 300. The third line indicates by the symbol to the left that a parameter is related to chilling, have a target value of 10° C., and it is also indicated that the actual value is 15° C. and a symbol is indicating that a controller is waiting for the temperature to reach the target value.

In the GUI, to the right on the screen, there are two columns which each indicate soft buttons related to a parallel line in the machine, i.e. here two lines corresponding to the example given in FIG. 2 that there are two parallel forming, filling and sealing lines. The bold and underlined "1" indicates that the representation is (at least, since some functions may be common for the two lines) valid for that line. There can also, as depicted at the lower part of the screen, be soft buttons related to operation tools and functions.

Figure 4:
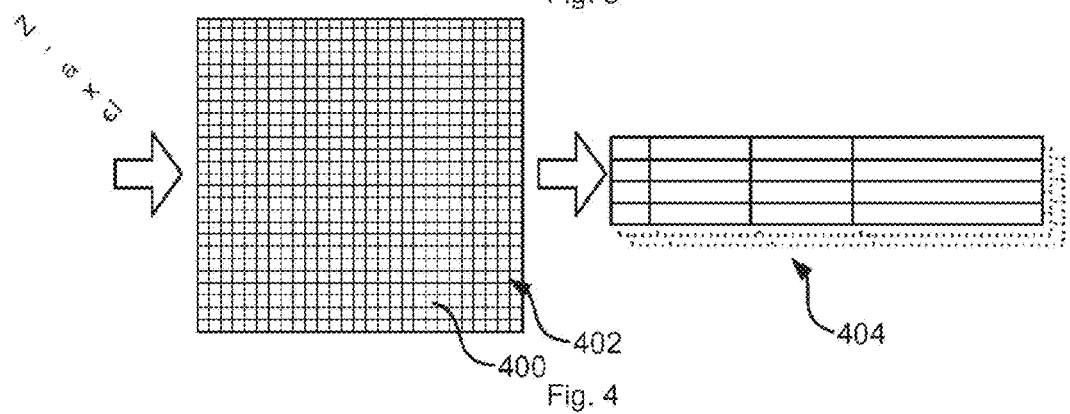
FIG. 4 schematically illustrates forming of a data structure from input signals and extracting information about occurred event(s).

FIG. 4 schematically illustrates forming of a data structure from input signals and extracting information about occurred event(s), which is performed by the processor of the monitoring system. From left, the arrow represents the input of the multitude of signals from the respective functional units of the packaging machine. The matrix-shaped element 400 illustrates a data structure where data items 402 are linked to respective functional units of the packaging machine and possibly also to particular parameters or functions of the respective functional unit. Here, the data structure 400 is illustrated as a two-dimensional matrix, but can be arranged as a multi-dimensional matrix or as a database structure. The data structure 400 can also be partitioned into several sub-structures where suitable, e.g. for relief of processing of the data to determine occurring events. When valid values for the respective parameters are provided at the signal input, the data items of the data structure are populated with the values. Signals may be present also for non-valid values, but they are preferably represented by a value indicating that they are not valid valued. The processor determines, from the data structure, by processing of the stored parameters in any event has occurred. The determination can be performed by applying rules and functions where selected parameters are used for calculations and/or comparisons. When events are identified, event describing data structures 404 can be created for each event. This can be done by copying selected parameters and/or including results from the rules and functions into the event describing data structure. Copying of selected parameters can be substituted by pointers to the data structure 400.

The rules and functions are designed based on the processes of the packaging machine, and a knowledge database may hold these rules and functions, and access to them can be made on regular basis or be trigged by one or more particular parameters having, reaching or falling below a certain predetermined value or being in a certain predetermined range.

For the understanding of the collection of the multitude of signals from the respective functional units of the packaging machine and the processing thereof to be able to provide relevant and understandable information to the operator, an example will be given below. Here, it should be noted that the example is given from an assumption of a particular design and set-up of the machine, and the signals as well as the amount of signals may deviate depending on the design and set-up of the machine, but the general principles set forth will provide the understanding of the approach.

Each functional unit can have its own local control unit, and one or more parts of each functional unit can in turn have their own local controllers. These control units are what normally is referred to as a Programmable Logic Controller, PLC. The machine as a whole then normally has an overall main controller which mainly has the purpose of overall operation control of the PLCs. From this controller structure, the collection of the signals is made from the local controllers. Thereby, the monitoring system will have a detailed view of each part of the machine.

Each PLC, preferably a main PLC of each functional unit, can provide one of a plurality of available code words related to a waiting state. In addition to that, the PLC can provide an extra code with additional information. The extra code is associated to the one of the plurality of code words by a pointer, relation or association. Here, more than one code word can be associated to the same extra code, e.g. where the extra code comprises information about wait time and more than one code word are related to different but similar wait states. For a machine with more than one line in parallel, but with a common PLC for a functional unit for the lines, there can also be provided indication on which of the lines (or all) that is in the wait state. There can also be indicated the number of wait causes given in the functional unit, i.e. if there is one or if there is several.

A code word can be a sequence of symbols, e.g. digits (binary, decimal, hexadecimal, etc.), where for example a first few symbols, e.g. three, indicates a machine identity, a few more symbols, e.g. two, indicates which functional unit of the machine that generated the code word, a few further symbols can indicate which line that generated the code word, another symbol can indicate whether it is related to a waiting state, another few symbols can indicate what type of waiting state it is and/or give a reference to an extra code, etc.

The collected code words related to a waiting state, and possible extra codes, line information and number of waiting causes, populates the data structure as demonstrated above, wherein event information can be extracted, indicated on the GUI, and then viewed on the GUI, e.g. in the information field, upon user interaction of the indications.

For providing a few words about alarms, which is not part of this invention, code words related to those alarms are provided from any PLC or the main controller, and they are then immediately, normally given as the plain error code, provided such that the operator becomes aware of the alarm. Thus, the operator will not mix up alarms and waiting states, and can decide on proper handling of the respective situation.

Returning to waiting state events, evaluation of the code words and the extra codes is thus made. From this, at least an indication on the number of waiting state events is made on the GUI, possibly divided into the lines of the packaging machine if there are more than one. Thus, the operator can select to view waiting events for a particular line, or for all the lines. When it is selected to view events for all lines, there can be provided an indication which line or lines an event relates to. When more than one event relates to the same functional module, this can also be indicated. The indications can be made using a general waiting state symbol, e.g. a clock or timeglass symbol, and/or an appropriate symbol for the event, wherein the symbol to be used for example can be derived from the extra code. For example, a general waiting state symbol can be indicated on the functional unit in the graphical representation of the packaging machine in the GUI while the particular appropriate symbol for the event can be indicated in a field where one or more events are listed. The particular symbol can also be indicated upon operator interaction with the indication of the general symbol in the presented representation. Depending on the event, there can also be extracted further information about the event in the evaluation, e.g. actual value and set point for a parameter being the cause of the event, information text, waiting time tags, etc. The GUI can provide the information in different ways, using one or more of symbols, values, text, animations, etc. which can be provided in the above mentioned field where the one or more events are listed.

Figure 5:
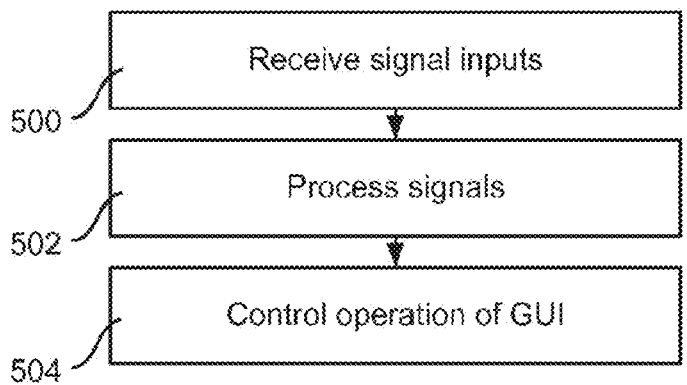
FIG. 5 is a flow chart illustrating a method according to an embodiment.

FIG. 5 is a flow chart illustrating a method according to an embodiment. As demonstrated above, the processor of the monitoring system receives 500 signal inputs from respective functional unit of the packaging machine. Normally, there is a flow of different signals to the processor, where some signals represents parameters being polled regularly while some signals represent parameters being provided only under certain circumstances. This irregularity of signals is taken care of by populating and updating the data structure as demonstrated above. The processor thus processes 502 the signals present in the data structure and based on the processing, a graphical user interface, GUI, is controlled 504 to provide information about the packaging machine including indicating occurring events in a viewed representation of the packaging machine as demonstrated above.

Figure 6:
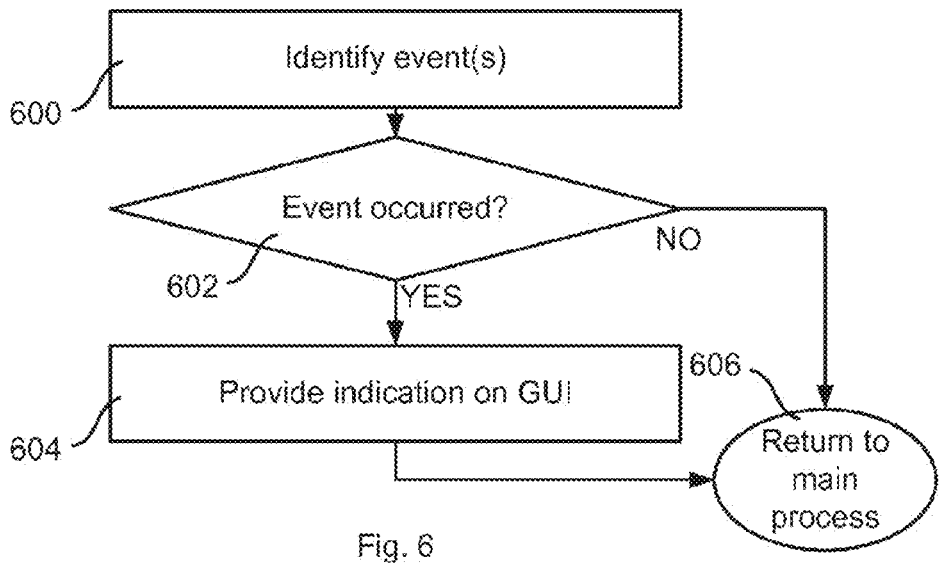
FIG. 6 is a flow chart illustrating identification of events and provision of an indication through the graphical user interface based thereon.

FIG. 6 is a flow chart illustrating identification of events and provision of an indication through the graphical user interface based thereon. Events are identified 600 by applying functions and rules to the collected data structure, as demonstrated above. It can thus be determined 602 whether an event has occurred. If no event has occurred, the processing just continues 606, while if an event has occurred, an indication is provided 604 through the GUI, and the processing continues 606, e.g. to identify further occurring events.

Figure 7:
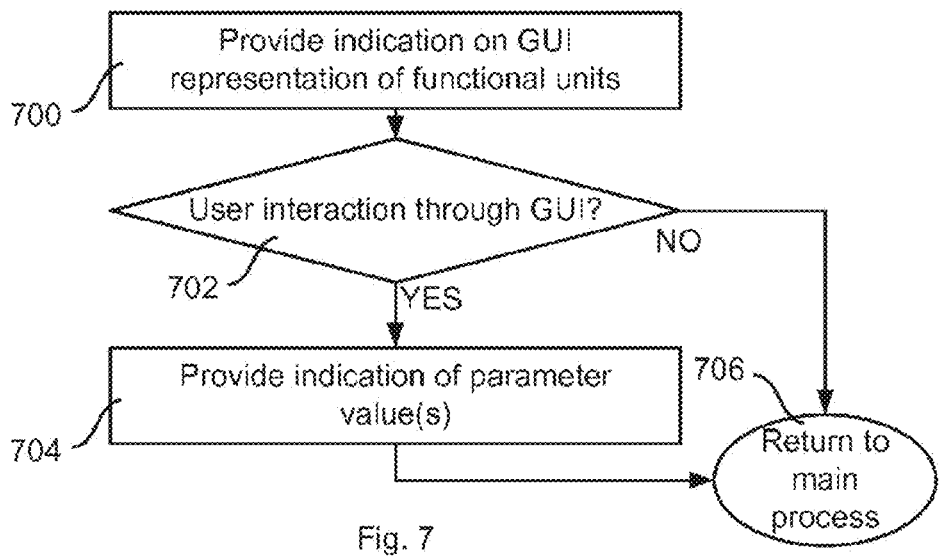
FIG. 7 is a flow chart illustrating provision of information through the graphical user interface and user interaction with the same.

FIG. 7 is a flow chart illustrating provision of information through the graphical user interface and user interaction with the same. As demonstrated above, and indication on the GUI representation of functional units is provided 700 for each present event. Upon a detected user interaction of the indication 702, relevant parameters are indicated by values on the GUI and the processing then continues 706, e.g. for receiving further user interaction or identifying further events. If no user interaction is received 702, the processing just continues 706.

Figure 8:
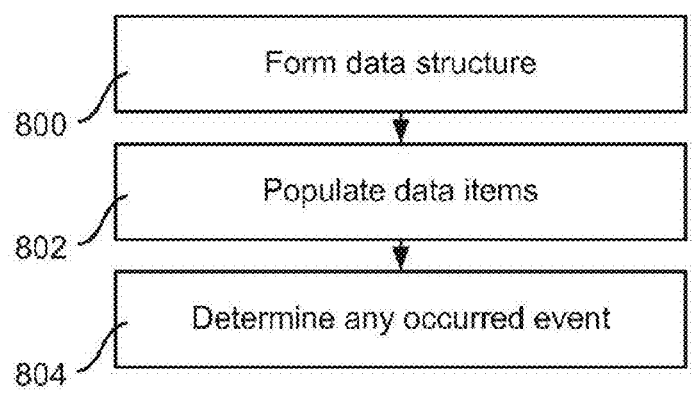
FIG. 8 is a flow chart illustrating forming of a data structure and determining occurred event(s) therefrom.

FIG. 8 is a flow chart illustrating forming of a data structure and determining occurred event(s) therefrom. A data structure is formed 800 as demonstrated above, where one or more data items for each functional unit are populated 802 with valid parameters received through the signal inputs from the respective functional units. By processing using rules and/or functions on the populated data items, events are determined 804, wherein control of the GUI can be made as demonstrated above.

Details of the actions demonstrated with reference to FIGS. 5 to 8 are similar to those demonstrated with reference to the GUI and the processing above.

Figure 9:
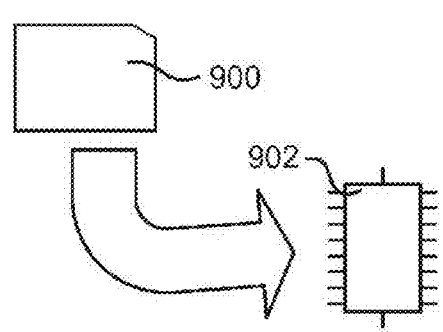
FIG. 9 schematically illustrates a computer readable medium with a stored computer program, and a processor suitable for downloading and executing the computer program.

FIG. 9 schematically illustrates a computer readable medium with a stored computer program, and a processor suitable for downloading and executing the computer program. The methods according to the present invention is suitable for implementation with aid of processing means, such as computers and/or processors, especially here where the monitoring system is provided with a processor. Therefore, there is provided computer programs, comprising instructions arranged to cause the processor of the monitoring system of the packaging machine to perform any of the methods according to any of the embodiments described with reference to FIGS. 4 to 8. The computer programs preferably comprises program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to FIGS. 4 to 8. The computer 902 and computer program product 900 can be arranged to execute the program code sequentially where actions of the any of the methods are performed stepwise. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A monitoring system for a packaging machine, where the packaging machine comprises a plurality of functional units arranged to perform operations in sequence including to form or receive a package, fill the package with liquid or solid content and seal the package, the monitoring system comprising
　a plurality of signal inputs, each arranged to receive signals from respective of said functional units indicating status or measured values;
　a graphical user interface arranged to enable interaction with an operator of the packaging machine; and
　a processor arranged to process said received signals and control operation of said graphical user interface,
　wherein the processor is arranged to, from said signals, identify an event if any of said functional units is preventing any other functional unit in the sequence to operate, and upon any such identified event, enable the graphical user interface to provide an indication thereupon in a displayed representation of the functional units of the packaging machine, and
　wherein the indication further comprises an indication of a parameter value being associated to that functional unit preventing any other functional unit in the sequence to operate and an indication of an ongoing action for causing that parameter value to enter a value where the functional unit associated with the event becomes able to fully operate.

2. The monitoring system according to claim 1, wherein the processor causes the graphical user interface to provide the indication of the parameter and the ongoing action upon receiving, through the graphical user interface, a user interaction associated with the indication of the event for the associated functional unit in the displayed representation of the functional units of the packaging machine.

3. The monitoring system according to claim 1, wherein the processor, for the processing of the received signals, is arranged
　to form a data structure with data items linked to respective functional unit of the packaging apparatus,
　to populate the data items, for each functional unit providing valid parameters, with said valid parameters, and
　to determine whether the event of any functional units preventing any other functional unit in the sequence to operate has occurred, for any set of data items in the data structure, respectively, based on said parameters.

4. A packaging machine comprising
　a plurality of functional units arranged to perform operations in sequence including to form or receive a package, fill the package with liquid or solid content and seal the package; and
　a monitoring system according to claim 1.

5. The packaging machine according to claim 4, wherein the plurality of functional units comprises
　a filling unit arranged to fill a package with the liquid or solid content; and
　a sealing unit arranged to seal the filled package.

6. The packaging machine according to claim 5, wherein the plurality of functional units further comprises
　a packaging material receiving unit arranged to receive packaging material; and
　a package forming unit arranged to form a piece of packaging material into at least a part of the package, wherein the packaging machine is arranged to provide formed packages to the filling unit.

7. The packaging machine according to claim 6, wherein the plurality of functional units further comprises a packaging material cutting unit arranged to cut packaging material provided from the packaging material supply and provide the piece of packaging material to the packaging material receiving unit.

8. The packaging machine according to claim 5, wherein the plurality of functional units further comprises a package receiving unit arranged to receive empty packages, wherein the packaging machine is arranged to provide the received packages to the filling unit.

9. The packaging machine according to claim 5, wherein the plurality of functional units further comprises a sterilizing unit arranged to sterilise the package before filling.

10. The packaging machine according to claim 5, wherein the plurality of functional units further comprises a forming unit arranged to form plastic into a part of a package or into a package.

11. The packaging machine according to claim 5, wherein the plurality of functional units further comprises an ejection unit arranged to eject filled and sealed packages out of the packaging machine.

12. A method of monitoring a packaging machine, where the packaging machine comprises a plurality of functional units arranged to perform operations in sequence including to form or receive a package, fill the package with liquid or solid content and seal the package, the monitoring method comprising
　receiving a plurality of signal inputs from respective of said functional units indicating status or measured values;
　processing said received signals; and
　controlling operation of a graphical user interface,
　wherein the processing of said signals comprises identifying an event if any of said functional units is preventing any other functional unit in the sequence to operate, and the controlling of operation of the graphical user interface comprises, upon any such identified event, enabling the graphical user interface to provide an indication thereupon in a displayed representation of the functional units of the packaging machine, and
　wherein the providing of the indication further comprises providing an indication of a parameter value being associated to that functional unit preventing any other functional unit in the sequence to operate and providing an indication of an ongoing action for causing that parameter value to enter a value where the functional unit associated with the event becomes able to fully operate through the graphical user interface.

13. The method according to claim 12, wherein the providing of the indication of the parameter and the ongoing action is performed upon receiving, through the graphical user interface, a user interaction associated with the indication of the event for the associated functional unit in the displayed representation of the functional units of the packaging machine.

14. The method according to claim 12, wherein the processing of the received signals further comprises
   forming a data structure with data items linked to respective functional unit of the packaging apparatus,
   populating the data items, for each functional unit providing valid parameters, with said valid parameters, and
   determining whether the event of any functional units preventing any other functional unit in the sequence to operate has occurred, for any set of data items in the data structure, respectively, based on said parameters.

15. A computer program comprising computer executable program code including instructions which when executed by a processor of a monitoring system for a packaging machine causes the processor to perform the method according to claim 12.

* * * * *